United States Patent [19]

Sun et al.

[11] 4,173,039

[45] Oct. 30, 1979

[54] CURRENT BASED POWER SUPPLY

[75] Inventors: Shan C. Sun, Saltsburg; Larry L. Church, Apollo, both of Pa.

[73] Assignee: Electric Power Research Institute, Inc., Palo Alto, Calif.

[21] Appl. No.: 906,221

[22] Filed: May 15, 1978

[51] Int. Cl.² ............................................ H02M 7/155
[52] U.S. Cl. ...................................................... 363/84
[58] Field of Search ........................ 320/1; 363/84–86, 363/126

[56] References Cited

U.S. PATENT DOCUMENTS

| | | |
|---|---|---|
| 3,846,692 | 11/1974 | Hill ........................................ 363/84 |
| 4,109,306 | 8/1978 | Mason ............................... 363/126 X |
| 4,118,768 | 10/1978 | Wilson, Sr. ............................. 363/85 |

Primary Examiner—William M. Shoop
Attorney, Agent, or Firm—Flehr, Hohbach, Test, Albritton & Herbert

[57] ABSTRACT

Multi-stage current operated power supply including linear transformer coupled to AC power lines and provides positive and negative regulated output progressively charged during each half cycle of input current while maintaining ampere-turns balance.

5 Claims, 11 Drawing Figures

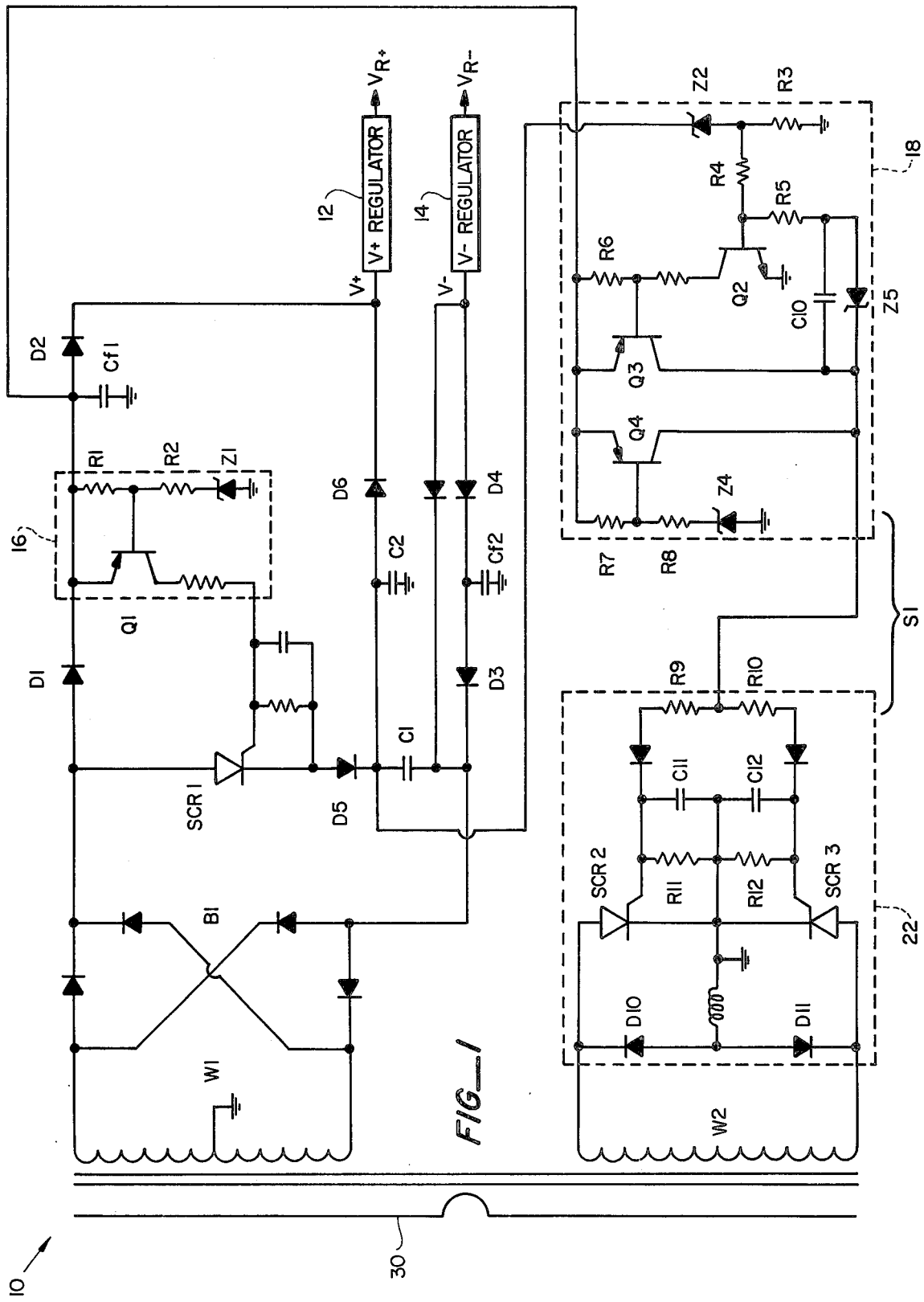
FIG_1

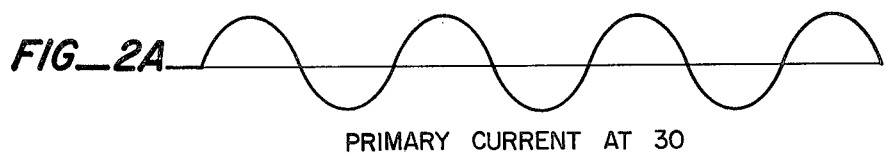
FIG_2A PRIMARY CURRENT AT 30
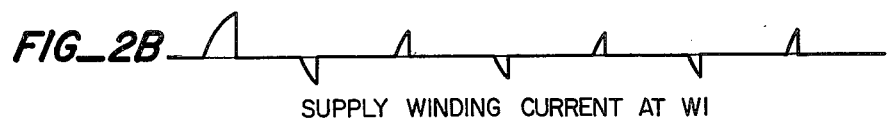
FIG_2B SUPPLY WINDING CURRENT AT W1
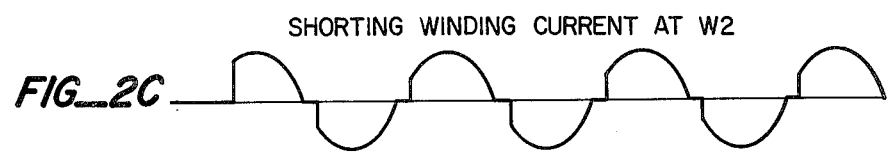
SHORTING WINDING CURRENT AT W2
FIG_2C
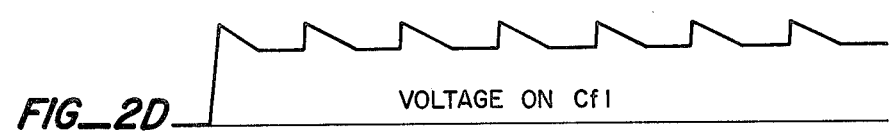
FIG_2D VOLTAGE ON Cf1
FIG_2E VOLTAGE ON C1(TOP) AND C2
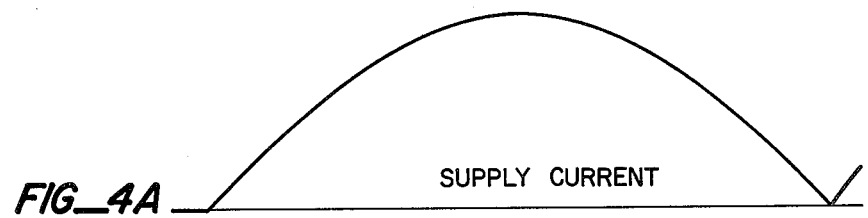
FIG_4A SUPPLY CURRENT
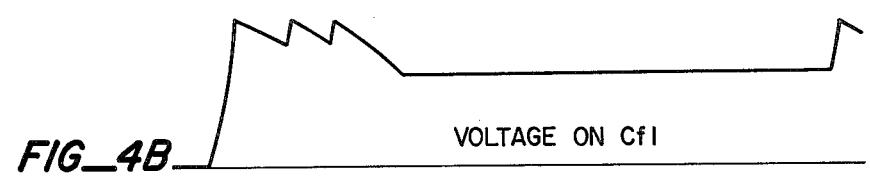
FIG_4B VOLTAGE ON Cf1
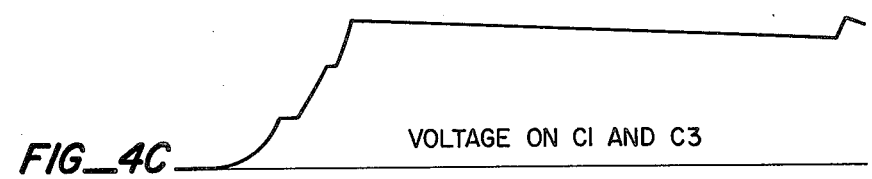
FIG_4C VOLTAGE ON C1 AND C3
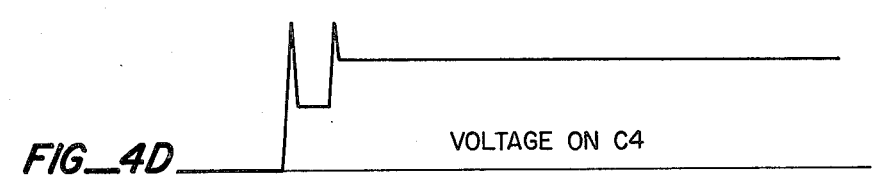
FIG_4D VOLTAGE ON C4

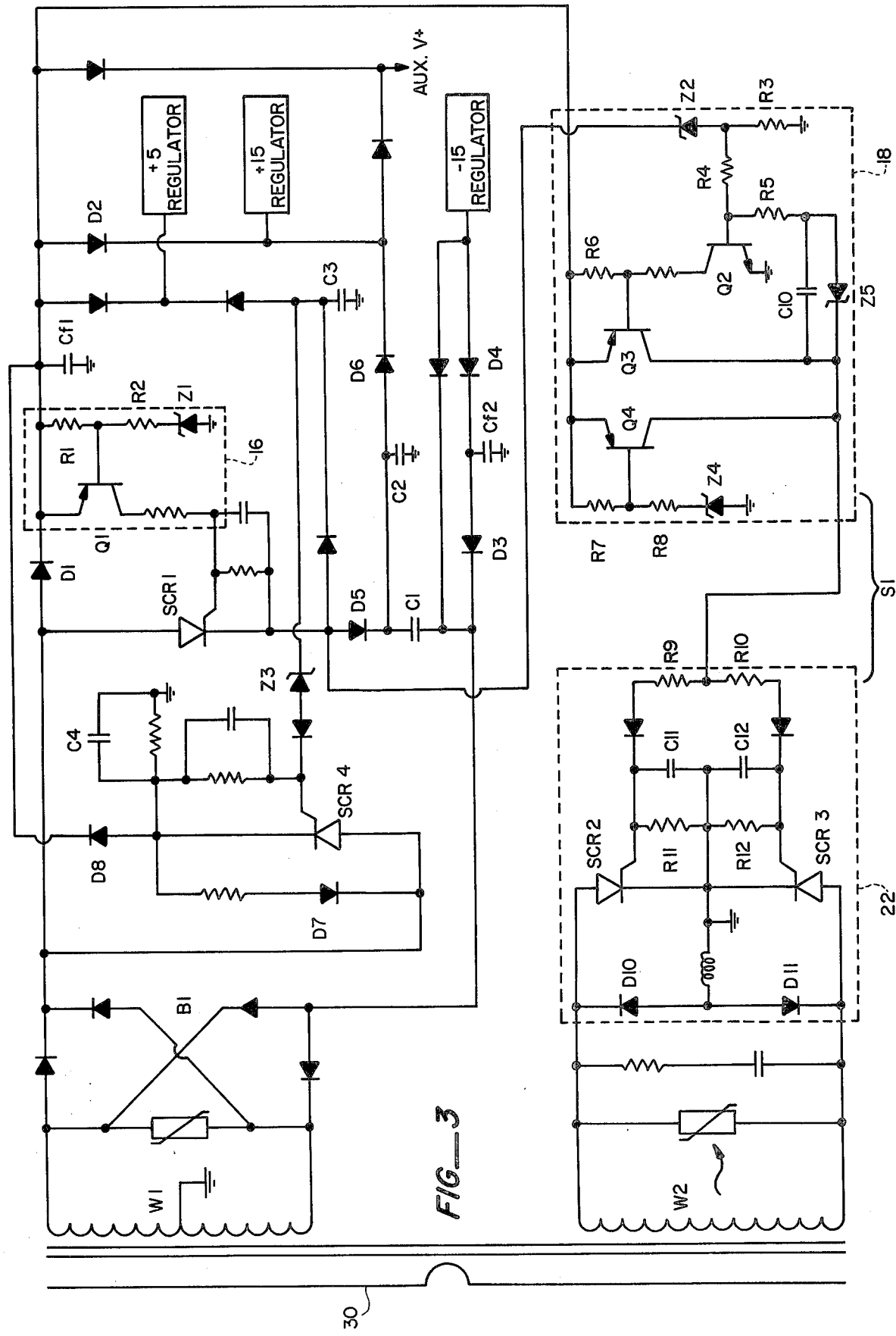
FIG—3

CURRENT BASED POWER SUPPLY

BACKGROUND OF THE INVENTION

This invention relates to current based power supplies and particularly to an improved supply operable from a wide range current source taken from an AC power line. The power supply of this invention includes a multi-stage energy storage system capable of very fast turn-on speeds and operation over a wide range of input supply current levels.

In monitoring the operating function of high voltage power supply lines (EHV) and for other purposes requiring equipment electrical power at locations remote from usual power sources there is needed a remotely locatable electric power supply to provide voltage regulated power at low levels for electronic equipment. Such a power supply should be capable of being operated by magnetic (transformer) coupling to the power supply lines themselves using the line current exclusively as a power source. It is desired that the power supply have a start-up time (from a fully de-energized condition to full regulation) following an initiation signal, such as a current zero crossing relating to breaker close, of extremely short timing, for example, less than 150 microseconds at a current magnitude of approximately 4.0 per unit (p.u.) (where 1 p.u.=rated line current). The power supply should be able to maintain full regulation during its operation over an input current range of from 0.02 p.u. to over 40 p.u. where 1 p.u. of current depending upon the line given, may vary from a few hundred amperes to a few thousand amperes. Aside from the wide range of current input and high turn-on speed requirements, the power supply should also be efficient and of a highly reliable design. Heretofore, a power supply meeting the foregoing requirements has not been available.

Heretofore, current transformers used in supplies proposed for the purpose of monitoring EHV power lines have been of the saturable type in which initial power delivered by the power supply may not be established for a full half cycle after initial breaker opening, particularly if the initial line current has the same polarity as the current by which the transformer becomes saturated prior to breaker opening.

OBJECTS OF THE INVENTION

Accordingly, it is an object of the present invention to provide a new and improved current based power supply which will overcome the above limitations and which will provide a unique means to acquire fast and efficient power from an AC current source.

A further object of the invention is to provide a particularly fast turn-on power supply which is operable from an AC current source having variable current flowing therein to provide an immediately available regulated voltage from the same after turn-on.

Another object of the invention is to provide a power supply employing a linear input transformer operating in very low flux levels, even under conditions of very high line currents.

Another object of the invention is to provide a power supply of the above character employing a multi-stage energy storage which is reliable, which employs no mechanical or electro-mechanical switching elements and which derives regulated positive and negative voltage supplies from a simple electronic circuit.

Another object of the invention is to provide a power supply of the above character particularly adapted to drive current transducers, high speed solid state relays and other equipment.

In accordance with the present invention a power supply is provided having an input current transformer including a first secondary charging winding and a second secondary shorting winding on the same core. The charging winding is connected to two interconnected charge circuits. A first fast charge circuit charges up rapidly upon initial operation of the power supply and is provided with an electronic switch for connecting a primary charge circuit after the fast charge circuit is charged to an acceptable level. After the primary charge circuit is charged to a predetermined level, a sensing means is provided for causing the second secondary winding to be connected which reduces the effectiveness of the first winding to a point below operation of its associated circuit. The foregoing is constructed in and arranged to occur in sequence beginning at the zero crossing of input current waveform on every half cycle regardless of polarity. In this way the charge on the voltage supply circuits is replenished each half cycle from the first half cycle after turn-on.

It is a particular feature of the present invention that a single capacitor bridging both the positive and negative portions of the primary charge circuit of the present invention serves as a portion of the means for generating and storing the charge for both supply polarities. This permits employment of a single set of sensing and switching elements for operating and controlling both polarities of the charging circuits.

These and other objects and features of the invention will become apparent from the following description when taken in conjunction with the accompanying drawings of which:

BRIEF DESCRIPTION OF THE DRAWINGS

FIG. 1 is a schematic block diagram including detailed circuit schematic of a power supply constructed in accordance with the present invention.

FIGS. 2A-2E are graphs illustrating the waveforms at various points of the circuit of FIG. 1.

FIG. 3 is a detailed schematic diagram of a circuit employing a modification and constructed in accordance with the present invention.

FIGS. 4A-4D are graphs illustrating certain waveforms occuring during the operation of the circuit of FIG. 3.

DETAILED DESCRIPTION OF THE PREFERRED EMBODIMENTS

The design of the present invention takes advantage of the transformer ampere-turns balance principle between the primary and secondary windings. Two secondary windings are included in the modified current transformer design. The high current winding W1, with fewer turns, supplies power to a regulator circuit. The second, low current winding W2, with more turns, is switched after the desired regulated voltage has been reached. After each line current zero-crossing, primary ampere-turns balancing is first achieved by the high current winding W1. Controlled switch S1 is open during this time interval and the power supply regulator circuit is the only load imposed on the transformer's secondary windings. When all regulated supply voltages are at their specified values, S1 is turned on or closed. When S1 is on, W2 is connected and an instantaneous voltage drop occurs at the high current winding output. This forces the diode bridge B1 into a reverse-biased condition, cutting off the current flow in the high current winding W1. From this switching point, until the next line current zero-crossing, the primary ampere-turns are balanced by the low current winding circuit. At the next zero-crossing, S1 is turned off automatically, again allowing current flow in the high current winding to replenish the power supply. With this design, the current burden on S1 is much reduced compared with the single secondary winding designs. This reduction, proportional to N2/N1, allows design trade offs between the current and voltage ratings of switch S1.

Referring now to FIG. 1, there is shown a detailed circuit diagram of one embodiment of the present invention having portions thereof set off in block diagram form to more clearly designate its functional operation. As shown, this embodiment provides for a dual, i.e. positive and negative, power supply application. An input current transformer 10 having a single turn primary is provided with two secondary windings W1, W2. The first secondary winding W1 is center tapped to reference or ground and is of a low number of turns, i.e. 20 turns each side of center tap. Winding W1 is a high current winding which supplies the current for replenishing both the fast charge and primary charge circuits of the power supply. Winding W2 has a high number of turns, for example 410, and when energized serves to disable the operation of the charging circuit and winding W1 while simultaneously taking over the ampere-turns balance function of the transformer. Thus, winding W2 is a low current winding which is allowed to conduct only after the power supply is furlly replenished on each half cycle. The basic system operation uses the transformer ampere-turns balance principle. When W1 is supplying current to the power supply circuits, W2 is open and W1 completes the ampere-turns balance, making available a high level of power supply charging current. When W2 is energized it takes over the ampere-turns balance and sustains a lower secondary current.

Means are provided for establishing a fast charge circuit and include fast charge capacitors of a low capacitance value and capable of accepting a rapid charge up to operating voltage upon-turn on of the device and consist of capacitors Cf1 and Cf2. Winding W1 is connected through a rectifier circuit connected in a full cycle rectifier arrangement B1, the output of which is connected to the regulators through series connected current directing diodes D1, D2, D3, D4 as shown. Upon turn-on, the rectified output of B1 serves to charge up both Cf1 and Cf2 to a predetermined level. Cf1 and Cf2 are connected respectively through current steering diodes D2, D4 to the respective positive and negative voltage inputs of the power supply for providing initial voltage. The output at diodes D2, D4 may be used to drive suitable voltage regulators 12, 14 which are conventional.

Means is provided for supplying a primary charge circuit including a capacitor means having high capacitance values for accepting a full charge for normal operation of said power supply at designed capability. Such means consists of capacitor C1 effectively connected across (or between) the power supplies and C2 connected between one polarity (positive being shown) of the power supply and reference potential.

Starting from zero crossing breaker close and an initial condition of previously discharged power supply, W1 will conduct first and supply current to capacitors Cf1 and Cf2 which are much smaller than C1 and C2 and therefore used to provide fast initial supply voltages of both polarity.

Means are provided for serving an an electronic switch for initially connecting the capacitors Cf1 and Cf2 to the charging winding W1 during this first portion of the charge cycle and for subsequently connecting the primary capacitors C1 and C2 to the windings during the latter portion of the charge cycle. Such means consists of the diode arrangement D1, D2, D3, D4 during the fast charge portion of the cycle and SCR1 and diode D5 during the primary charge portion of the charge cycle. Whenever SCR1 is fired it conducts through D5 to charge capacitors C1 and C2. This automatically stops the charging current to Cf1 and Cf2 since diodes D1, D3, would be back biased under that condition. During the primary portion of the charging cycle when C1 and C2 are being charged, Cf1 and Cf2 are discharging by supplying power to respective loads 12, 14. The values of Cf1 and Cf2 are chosen such that they will permit fast initial charging and enough storage capability to maintain regulated supplies or other loads at the output during the charging of primary circuits including C1, C2. Thus the value of the capacitance required for Cf1 and Cf2 depends upon the startup speed requirement, load conditions and the available current in winding W1 over the range of operation expected.

Means forming a fast charge sensing circuit 16 is provided for detecting the level of charge on capacitors Cf1 and Cf2 and for operating switch means SCR1 when the fast charge circuit reaches a predetermined level. Such means consists of transistor Q1 connected from the charged side of capacitor Cf1 and having its output (collector) connected to the firing terminal of SCR1. The base of transistor Q1 is connected to a voltage sensing reference including resistors R1, R2 and zener diode Z1. Whenever the predetermined level of voltage is achieved by capacitor Cf1 determined by zener Z1, conduction of transistor Q1 results and fires SCR1 into conduction to begin charging of primary capacitor C1, C2.

Means 18 is provided for sensing the primary charge circuit voltage level (the charge level on the capacitors C1, C2). Such sensing means include zener Z2 connected in series with the base circuit of transistor Q2, and grounded through resistor R3. The circuit of Q2 controls the transistor Q3 which is switched into conduction whenever the voltage on Z2 exceeds its reference breakdown level as sensed at the input to C1, C2. When Q3 is in conduction the voltage as appearing at the output of CF1 is passed through Q3 to the input of shorting circuit 22. An additional portion of the sensing circuit including Q4, resistors R7, R8, and zener diode Z4 serve as additional protection for preventing the voltage from exceeding predetermined upper reference level determined by the value of Z4. Thus if the voltage level exceeds Z4 reference, same conducts and places Q4 in conduction to thereby also energize the shorting circuit 22. This firing would take place upon failure of previous firing means.

Shorting circuit 22 serves as means for opening the secondary side W1 and closing the circuit to windings W2. Thus whenever either condition of a voltage above a predetermined level at the input to the primary charging circuit C1, C2, Q2 fires Q3 to energize shorting circuit 22 and whenever the voltage at CF1 appears greater than a predetermined value determined by Z4, Q4 fires to energize shorting circuit 22.

The two silicon controlled rectifiers SCR2 and SCR3 are connected in a cathode grounded configuration and diodes D10, D11 across windings W2 and having their gates connected to the output of the sensing means 18. Whenever the voltage at the collectors of Q3, Q4 is high, both SCR2 and SCR3 are fired through diodes D12, D13, providing a short conductive path for winding W2.

Conduction of either SCR2 or SCR3 and D10 or D11 depends upon polarity of the input wave form and causes an instant voltage drop in the W1 winding, thereby reverse biasing the rectifier diode circuit B1, causing current flow in W1 to cease. Shorting circuit 22 across winding W2 is designed so that it automatically resets and disengages at every half cycle of operation, i.e. every current zero crossing, thereby to permit current conduction in W1 to begin again during each half cycle so as to provide power supply replenishment. In normal operation, Q4 is not conductive, Z4 being selected to have a sufficiently high value that it does not conduct unless abnormally high values of voltage appear at the input to CF1.

The current transformer is composed of two secondary windings on a silicon steel tape-wound ring core. In this application the core dimensions are 10.5 in. outside diameter, 8.25 in. inside diameter, and 6.75 in.$^2$ cross sectional area. Following start of current flow, such as a breaker close, the center-tapped secondary winding W1 conducts current first, channeling all the available current into the power supply storage capacitors. During this time the lower winding W2 is open circuited. The current magnitude in the W1 winding is one-fortieth of the primary current due to a 40 to 1 turns ratio.

FIG. 2 shows a timing diagram illustrating the described operation. It is noted that capacitor C1 in both FIGS. 1 and 2 is capable of supplying power for both positive and negative output use and is always charged to a voltage twice the magnitude of the C2 voltage. The function of C2 is two-fold. It is the main energy storage for positive voltage supply and also provides a neutral or common reference for the positive and negative output voltages. This arrangement greatly simplifies a practical design which otherwise would require an additional circuit to provide sensing, firing, and switching functions for a negative supply voltage generation. The only limitation of this simplified design is that the negative supply current must be always less than or equal to the positive supply load. For applications where the positive load current is less than the negative, one can use a design reversing the polarity functions of appropriate components, i.e. use C2 on the negative supply.

A complete detailed circuit of the present invention is given with a similar embodiment in FIG. 3. In addition, the capacitors Cf1 and Cf2, which provide fast power initially, are permitted to have periodic recharging during the charging time of the main energy storage capacitors C1 through C3. This modification allows an unterrupted initial power supply even at very low line currents. The basic circuit elements added to achieve this function are Scr4, zenner diode Z3, and C4. When Cf1 and Cf2 have been charged, and SCR1 has been fired to begin the charge on C1, C2 and C3, Cf1 and Cf2 supplies the output and therefore their voltages drop.

The voltage difference between the main energy storage capacitors C1 through C3 and the added capacitor C4 is constantly being sensed by Z3. When this difference voltage reaches Z3 voltage, SCR4 is fired to charge C4, causing SCR1 to turn off. C4 is a relatively small capacitor and, therefore, charges up quickly. Consequently Cf1 and Cf2 are replenished via D1, D3. With Cf1 and Cf2 replenished, SCR1 is again fired, turning off SCR4. C4 then discharges down to a voltage commensurate with the voltage on C3, approximately equal to Z3 voltage. C1 through C3 then continue to charge toward the Z3 voltage where the process repeats for another replenishment on Cf1 and Cf2. This periodic replenishment will terminate when the voltage on C1, 2, 3 attains Z2 voltage and the SCR circuit in W2 winding is activated. The operation may or may not repeat during the next half cycle depending upon the voltage drop on C3 and the line current condition. FIGS. 4 illustrates this periodic replenishment operation.

The 16 v zener Z16 defines a firing interval to circuit 22. That is, the firing pulse begins when Z2 voltage (24 v) is reached, where C1, C2 and Cf1 will all be at 24 v, and will continue then until Cf1 droops down to 16 v, Z5 voltage, where the droop here will be due to its sourcing of Q3 (i.e. it feeds its emitter). (C1, C2 will be feeding V+(12)).

In summary, the current first charges the capacitors Cf1 and Cf2 to a voltage which is sufficient to operate the regulators 12, 14. Once this condition is met, SCR1 is fired to provide a charging path to the major energy storage capacitors C1, C2 and C3. When the voltage on these capacitors reaches approximately three volts, SCR4 is fired steering current away from SCR1 to charge C4. With a relatively small size, C4 is quickly charged to a voltage which is high enough to forward bias D1, D3, and D8. Cf1 and Cf2 which have been discharging energy to the regulators are, therefore, replenished. This replenishment will result in another firing on SCR1 when the voltage across Cf1 reaches approximately 24 volts (Z1 voltage) again. This operation automatically turns off SCR4, and C4 is discharged through D7. When C1, C2 and C3 gain another few volts, SCR4 will be fired again turning off SCR1. These operations will repeat until the voltage on C1, C2, and C3 reaches a value of approximately 24 volts. Then Q2 will conduct resulting in a firing of the SCR's in the W2 winding. Once the W2 winding conducts, the current flow in the W1 winding ceases. The regulators will then rely on C1, C2, and C3 to supply power for continuous operation. These capacitors are capable of maintaining the supply voltage in regulation until the next half cycle replenishment.

FIGS. 4A–4D show the current and voltage wave forms on the components of FIG. 3. In FIG. 4A the supply current is illustrated; FIG. 4B is the voltage on CF1; FIG. 4C is the voltage on C1 and C3; and FIG. 4D is the voltage on C4.

While the invention has been described with reference to specific embodiments, the description is illustrative of the invention and is not to be construed as limiting the invention. Various modifications and changes may occur to those skilled in the art without departing from the true spirit and scope of the claims as defined by the appended claims.

What is claimed is:

1. A DC power supply adapted for current operation from AC power lines comprising, an input current transformer including a secondary charging winding for supplying charging power to the power supply, a bypass secondary winding for conducting during portions of each AC cycle after the power supply output levels have been charged and replenished to pre-determined levels, a fast charge circuit means including first capacitor means of low value and fast charge rate for accepting initial charge upon turn-on, a primary charge circuit means including capacitor means having high capacitance value for accepting a full charge for operating said power supply at design capability, electronic switch means for initially connecting said fast charge circuit means to said charging windings during a first portion of a charge cycle and for connecting said primary charge circuit means to said windings during subsequent portion of said charge cycle, fast charge circuit sensing means for detecting the level of charge on said capacitor means of said fast charge circuit means and for operating said switch means upon said fast charge circuit means reaching a pre-determined level, a secondary winding associated with said current transformer, primary charge circuit sensing means for detecting the charge level on said capacitor means of said primary charge circuit means and for initiating said secondary winding when the primary charge level has reached a pre-determined level whereby the voltage and current in said first winding collapses to stop the primary charging cycle while the second secondary winding serves to maintain the ampere turns balance of said transformer.

2. A power supply as in claim 1 wherein said bypass circuit means is constructed and arranged to reset upon each zero crossing of the supply signal in said secondary windings.

3. A power supply as in claim 1 in which said secondary windings are center tapped to provide a positive and negative voltage output about a reference and in which said fast charge circuit means include a positive and a negative polarity capacitor connected to said positive and negative voltage outputs respectively.

4. A power supply as in claim 3 further in which said primary charge circuit means includes a first capacitor connected between one of the outputs of said fast charge circuit means and reference potential and a second capacitor connected between one output of said fast charge circuit means to the other output thereof.

5. A power supply as in claim 1 further including means for intermittently replenishing said fast charge circuit means during the period in which said primary charge circuit means is being charged.

* * * * *